United States Patent

Okuda (10) Patent No.: US 9,360,026 B2
(45) Date of Patent: Jun. 7, 2016

(54) POSITIONER (71) Applicant: AZBIL CORPORATION, Tokyo (JP)

(72) Inventor: Kouji Okuda, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 670 days.

(21) Appl. No.: 13/650,128

(22) Filed: Oct. 12, 2012

(65) Prior Publication Data

US 2014/0102549 A1 Apr. 17, 2014

(30) Foreign Application Priority Data

Oct. 14, 2011 (JP) ................................. 2011-226986

(51) Int. Cl.
*F16K 37/00* (2006.01)
*F15B 5/00* (2006.01)
*F15B 19/00* (2006.01)

(52) U.S. Cl.
CPC ............. *F15B 5/006* (2013.01); *F16K 37/0083* (2013.01); *F15B 19/005* (2013.01); *F15B 2211/8755* (2013.01); *Y10T 137/2278* (2015.04); *Y10T 137/7761* (2015.04)

(58) Field of Classification Search
CPC ................ F16K 37/0083; F15B 5/006; F15B 2211/855; F15B 2211/86; F15B 19/005; Y10T 137/7761
USPC ..................... 251/129.04; 700/282; 324/555; 137/554, 556, 557
See application file for complete search history.

(56) References Cited

U.S. PATENT DOCUMENTS

| 5,251,148 | A | 10/1993 | Haines et al. | |
|---|---|---|---|---|
| 6,202,680 | B1 | 3/2001 | Irokawa et al. | |
| 7,167,537 | B2 | 1/2007 | Loechner | |
| 8,459,289 | B2 | 6/2013 | Inagaki | |
| 2003/0183791 | A1* | 10/2003 | Meinhof | 251/129.04 |
| 2005/0109395 | A1 | 5/2005 | Seberger | |
| 2006/0266966 | A1* | 11/2006 | Karte et al. | 251/129.04 |
| 2007/0057216 | A1 | 3/2007 | Hoffmann et al. | |
| 2010/0006790 | A1* | 1/2010 | Tabelander | 251/129.04 |

(Continued)

FOREIGN PATENT DOCUMENTS

| CN | 1247945 | 3/2000 |
|---|---|---|
| CN | 201363482 | 12/2009 |

(Continued)

OTHER PUBLICATIONS

Chinese Office Action dated Jan. 16, 2014, from corresponding Chinese Application No. 201210384598.X.

*Primary Examiner* — William McCalister
*Assistant Examiner* — Ian Paquette
(74) *Attorney, Agent, or Firm* — Troutman Sanders LLP (57) ABSTRACT

In a comparing circuit, the value of a control signal from a higher-level device and a normal range that is set for the control signal are compared, and the result is sent to a control unit. The control unit, when sent the result indicating that the value of the control signal is outside of the normal range, forcibly adjusts the electric current signal (the adjusted electric current) to the electropneumatic converter to zero, regardless of the deviation between the value indicated by the control signal and the value indicated by the valve opening signal. The adjustment of the electric current in the control unit is performed using a normal function that is possessed by the control unit, that is, the function for changing continuously the value of the electric current signal in accordance with the deviation.

1 Claim, 5 Drawing Sheets (56) References Cited

U.S. PATENT DOCUMENTS

2010/0033192 A1* 2/2010 Somfalvy .................. 324/555
2011/0240138 A1    10/2011 Inagaki
2012/0253534 A1* 10/2012 Murata et al. ............... 700/295
2013/0282191 A1* 10/2013 Okuda et al. ............... 700/286

FOREIGN PATENT DOCUMENTS

| CN | 102207222 | 10/2011 |
| JP | 7-180701 | 7/1995 |
| JP | 2007-512622 | 5/2007 |

* cited by examiner

| Iin | Between 5 and 19 mA | Iin <5 mA | 19 mA <Iin |
|---|---|---|---|
| Vi | 1 to 4 V | Vi <1 V | 4 V <Vi |
| Vcmp1 | High | Low | High |
| Vcmp2 | High | Height | Low |
| Vo | Control | Forced Zero | Forced Zero |
| Io | Control | Forced Zero | Forced Zero |

FIG. 5

POSITIONER

CROSS-REFERENCE TO PRIOR APPLICATION

This application claims priority to Japanese Patent Application No. 2011-226986, filed Oct. 14, 2011. This application is incorporated herein by reference in its entirety.

FIELD OF TECHNOLOGY

The present invention relates to a positioner for controlling the degree of opening of a regulator valve in accordance with a control signal that is sent from a higher-order device.

BACKGROUND

Conventionally this type of positioner is designed so as to operate with a DC electric current signal between 4 and 20 mA (a control signal) sent through a pair of electric wires from a higher-level device. For example, if a current of 4 mA is sent from the higher-level system, the opening of the regulator valve is set to 0%, and if a current of 20 mA is sent, then the opening of the regulator valve is set to 100%.

Rapid responsiveness is important in industrial process control systems, such as oil or gas processing systems, or the like, wherein a number of such regulator valves are installed. That is, it is important for there not to be hidden leaks or uncontrolled discharges of toxic or flammable chemical substances, gases, or the like.

Because of this, it is desirable for a regulator valve to have a function to shut down a valve at the time of an emergency, and for this purpose, positioners for controlling the degrees of opening regulator valves are designed to have such emergency shutdown functions.

In recent years intelligent positioners, wherein the positioners are equipped with microprocessors, have become popular. Such intelligent positioners, in addition to software for controlling the degree of opening, also have software for an emergency shutdown function, enabling full closure of the valve when there is an emergency.

For example, the value of a control signal that is sent from a higher-level device is monitored through a processing operation of a microprocessor following the software for controlling the degree of opening, and if it is confirmed that the value of that control signal has fallen below a prescribed setting value, then the valve is forcibly closed completely.

However, it is not particularly desirable the production of this function at the time of an emergency shutdown to be through such software. This is because validation of the reliability of digital circuitry, and the like, associated with the microprocessor for executing the software, and of the software itself, is costly and time-consuming. Moreover, because the processing operations following the software are complex to begin with, the risk increases with the inability to tolerate the failure rate of the emergency shutdown achieved through such a processing operation.

Given this, in, for example, Japanese Examined Patent Application Publication 2007-512622 ("JP '622"), an example is presented wherein the positioner itself is provided with a circuit for the emergency shutdown, rather than relying on software. In the electropneumatic controller (positioner) set forth in JP '622, a shutdown unit is provided as a circuit for an emergency shutdown between the electropneumatic converter and a control unit that is structured from a microprocessor or a digital circuit.

Figure 5:
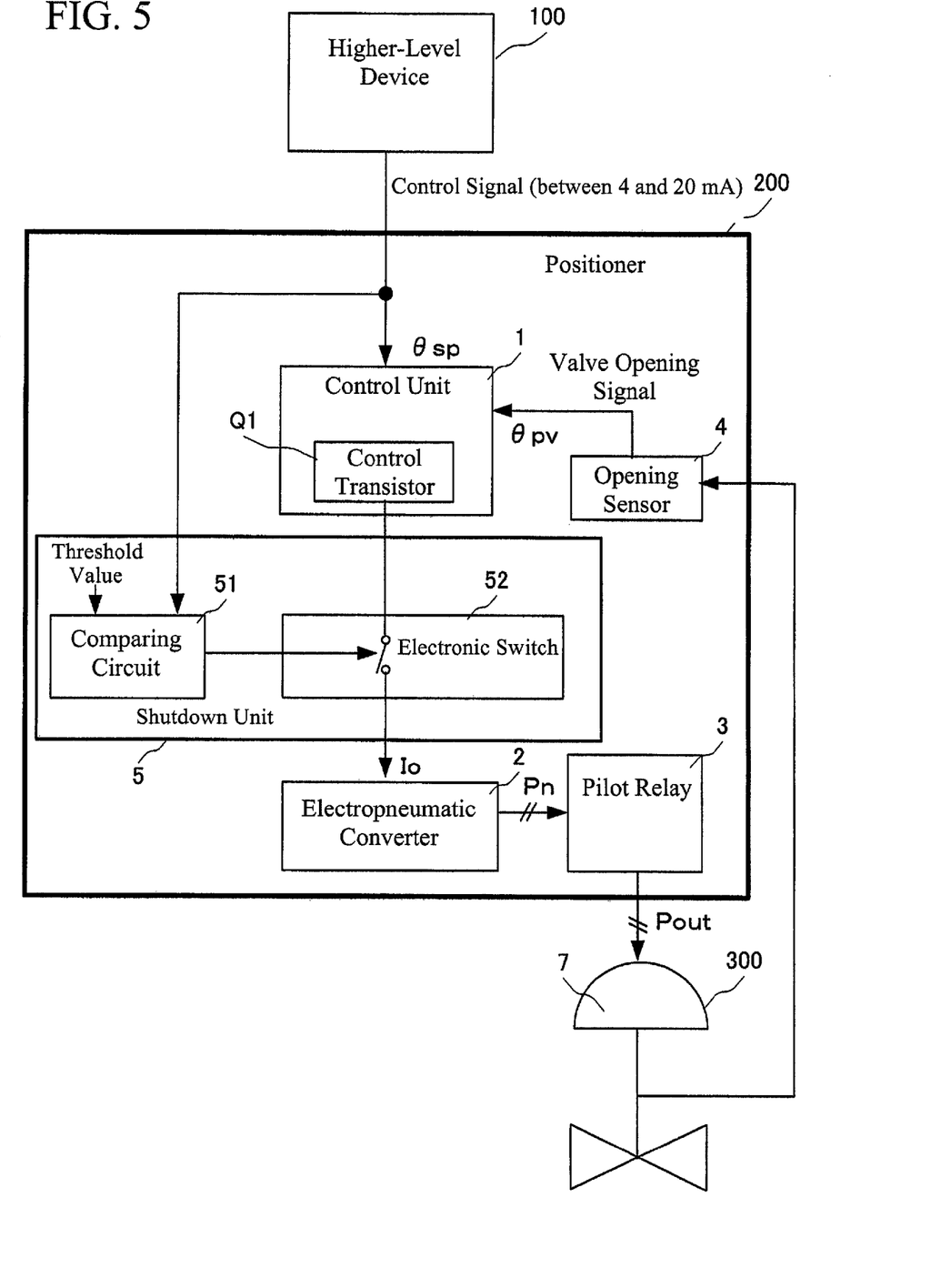
FIG. 5 is a diagram illustrating some of the components in a conventional positioner that is provided with a shutdown unit as an emergency shutdown circuit.

FIG. 5 illustrates a positioner provided with a shutdown unit between the control unit and the electropneumatic converter. In this figure, 100 is a higher-level device, 200 is the positioner, and 300 is a regulator valve. The positioner 200 is provided with a control unit 1, an electropneumatic converter 2, a pilot relay 3, and an opening sensor 4, where a shutdown unit 5 is provided between the control unit 1 and the electropneumatic converter 2.

In this positioner 200, when a control signal (a DC electric current signal) of between 4 and 20 mA is sent from the higher-level device 100, the control unit 1 inputs an valve opening signal that is fed back through an opening sensor 4 from the regulator valve 300, and calculates a deviation between the value indicated by the control signal (a setting opening $\theta$ sp) and the value indicated by the valve opening signal (the actual opening $\theta$ pv), to continuously vary the value in accordance with this deviation, to thereby output an adjusted electric current signal Io as an adjusted electric current. A control transistor Q1 is used in adjusting the electric current in the control unit 1.

The electropneumatic converter 2 inputs an electric current signal (the adjusted electric current) Io from the control unit 1 through the shutdown unit 5, to convert the inputted electric current signal (the adjusted electric current) Io into a pneumatic signal Pn. Note that in the electropneumatic converter 2, the electric current signal (the adjusted electric current) Io from the control unit 1 is supplied to a magnetic excitation coil, to adjust the distance of separation between a nozzle that releases the supply air and a flapper, to output, as the pneumatic signal Pn, the nozzle back pressure obtained thereby. The pilot relay 3 amplifies the pneumatic signal Pn from the electropneumatic converter 2, to supply it to the operating device 7 of the regulator valve 300 as the output pneumatic pressure Pout.

The shutdown unit 5 comprises a comparing circuit 51 and an electronic switch 52 through an electronic device such as an FET, where the electronic switch 52 is provided in the route for supplying the electric current signal (the adjusted electric current) Io to the electropneumatic converter 2 from the control unit 1. In the shutdown unit 5, the control signal from the higher-level device 100 to the control unit 1 is branched and inputted, where if the value of this control signal that is branched and inputted is less than a prescribed threshold value, then the electronic switch 52 is turned OFF, to shut down the supply of the electric current signal (the adjusted electric current) Io from the control unit 1 to the electropneumatic converter 2. Doing so reduces the output pneumatic pressure Pout from the positioner 200 to essentially near zero, causing the regulator valve 300 to be closed forcibly.

In the positioner, the adjusted electric current that is supplied to the electropneumatic converter is important because it controls the degree of opening of the regulator valve. There can be a risk that the plant could be shutdown if there was an unlikely interruption of the supply of the adjusted electric current to the electropneumatic device in a state wherein no shutdown should be performed. For example, if there were a broken line in the loop of the adjusted electric current that is supplied to the electropneumatic converter, then the supply would be stopped.

However, in the positioner 200 that is illustrated in FIG. 5, the electronic switch 52 is disposed in the loop for this adjusted electric current, to achieve the shutdown if the electronic switch 52 is turned OFF. In such a structure, there is the risk that the electronic switch 52 may become damaged due to a shock or impact from, for example, noise, due to a defect therein, or through becoming worn, so that the existence of this electronic switch 52 becomes a factor that may trigger an unnecessary shutdown notwithstanding the operating conditions being normal. Moreover, it is necessary to add this electronic switch 52 between the control unit 1 and the electropneumatic converter 2, which increases costs.

The present invention solves such problems, and the object thereof is to provide a positioner that can produce an emergency shutdown function without the provision of an electronic switch in the adjusted electric current loop and without relying on software.

SUMMARY

The example of the present invention, in order to achieve the object set forth above, is a positioner including a controlling portion that inputs a control signal that is sent from a higher-level device and an valve opening signal that is fed back from a regulator valve, to calculate the deviation between the value indicated by the control signal and the value indicated by the valve opening signal, to output an electric current signal that is adjusted through changing the value continuously in accordance with the deviation, and an electropneumatic converting portion for converting the electric current signal from the controlling portion into a pneumatic signal, to provide an output pneumatic pressure to an operating device of a regulator valve based on the pneumatic signal from the electropneumatic converting portion, having a comparing circuit for branching and inputting the control signal from the higher-level device to the controlling portion, and comparing the value of the control signal that has been branched inputted to a normal operating range that is established for this control signal, to output the comparison result to the controlling portion, where if sent a comparison result from the comparing circuit indicating that the value of the control signal is outside of the normal range, the controlling portion forcibly adjusts to zero the electric current signal to the electropneumatic converting portion, regardless of the deviation.

Given the examples of the present invention, the control signal to the controlling portion from the higher-level device is branch inputted into the comparing circuit, and, in the comparing circuit, the value of this control signal is compared to a normal range that is established for the control signal, and the comparison result is sent to the controlling portion. When a comparison result indicating that the value of the control signal is outside of the normal range is sent from the comparing circuit, the controlling portion forcibly adjusts to zero the electric current signal to the electropneumatic converting portion, regardless of the deviation between the value indicated by the control signal (the setting opening) and the value indicated by the valve opening signal (the actual opening). The adjustment of this electric current signal to zero is performed using the normal function of the controlling portion, that is, using the function for adjusting by continuously changing the value of the electric current signal in accordance with the deviation between the value indicated by the controlling signal (the setting opening) and the value indicated by the valve opening signal (the actual opening). Consequently, in the examples of the present invention there is no need to provide an electronic switch in the loop for the adjusted current, thus eliminating the impact of damage to this electronic switch, and also avoiding an increase in cost.

In the examples of the present invention, if, for example, the normal range for the control signal is between 5 and 19 mA, and the value of the control signal falls below 5 mA or the value of the control signal rises above 19 mA, then the electric current signal to the electropneumatic converting portion is forcibly zeroed. Note that the normal range may be set to be higher than 5 mA, or the normal range may be set to be lower than 19 mA. If the normal range is set to be higher than 5 mA, the electric current signal to the electropneumatic converting portion can be zeroed forcibly if the value of the control signal falls below 5 mA. If the normal range is set to be below 19 mA, the electric current signal to the electropneumatic converting portion can be zeroed forcibly if the value of the control signal rises above 19 mA.

Given the examples of the present invention, the control signal to the controlling portion from the higher-level device is branch inputted into the comparing circuit, and, in the comparing circuit, the value of this control signal is compared to a normal range, where if the value of the control signal is outside of the normal range, then the normal function of the controlling portion is used to adjust the electric current signal to the electropneumatic converting portion to zero, making it possible to produce an emergency shutdown function without providing an electronic switch in the adjusted electric current loop and without depending on software.

DETAILED DESCRIPTION

Figure 1:
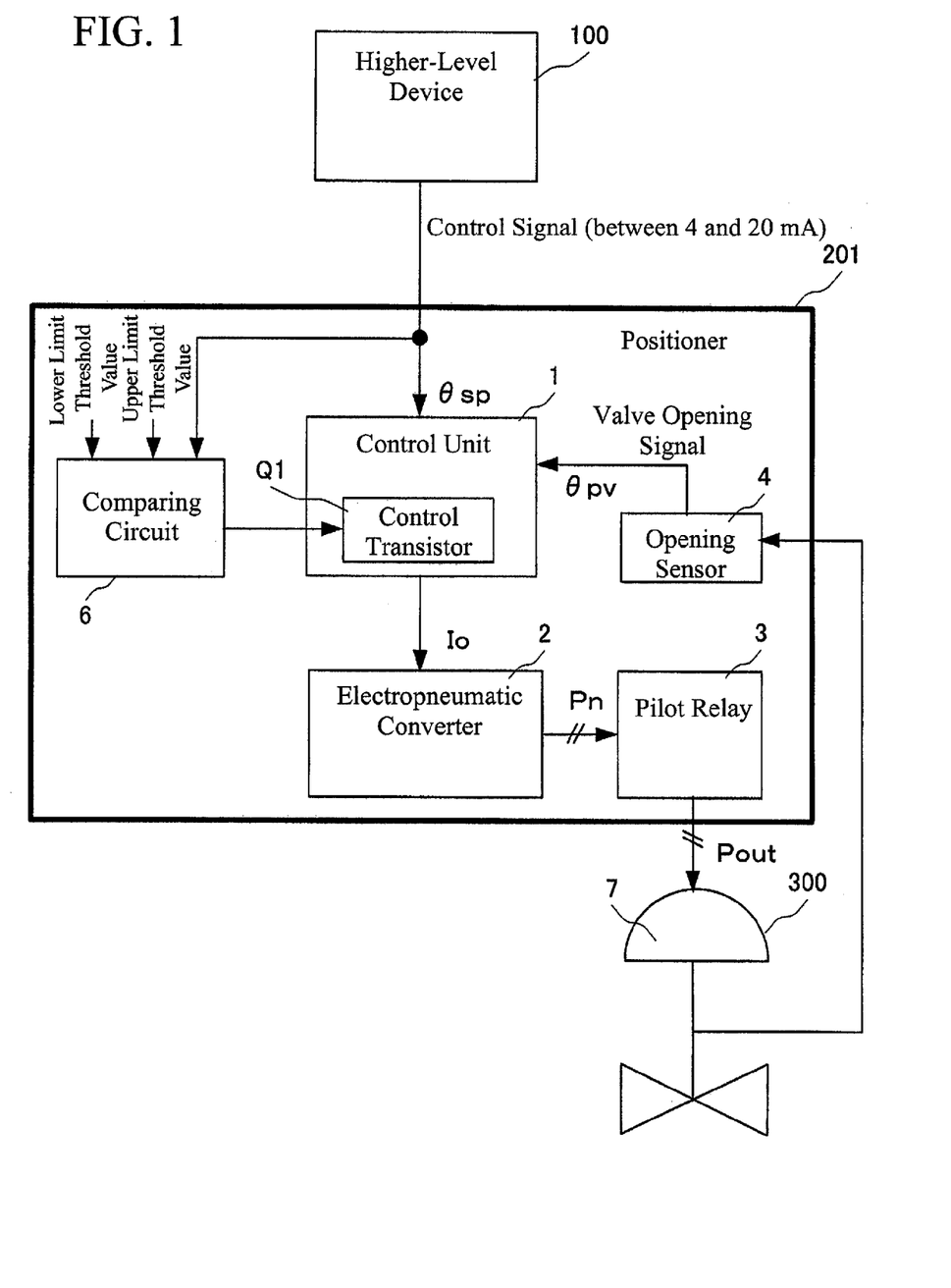
FIG. 1 is a diagram illustrating portions of a positioner according to an example of the present invention.

Examples according to the present invention are explained below in detail, based on the drawings. FIG. 1 is a diagram illustrating portions in an example of a positioner according to the present invention. In this figure, codes that are the same as those in FIG. 5 indicate identical or equivalent structural elements as the structural elements explained in reference to FIG. 5, and explanations thereof are omitted.

The point of difference between the positioner 201 in the present example and the conventional positioner 200 is the point that the electronic switch 52 is removed from the supply path of the electric current signal (the adjusted electric current) Io from the control unit 1 to the electropneumatic converter 2, and the provision of the comparing circuit 6 instead of the comparing circuit 51, where the comparison result from this comparing circuit 6 is sent to the control unit 1.

In this positioner 201, the control unit 1 inputs a 4 through 20 mA control signal (a DC electric current signal) that is sent from the higher-level device 100 and an valve opening signal that is fed back through the opening sensor 4 from the regulator valve 300, to calculate a deviation between the value indicated by the control signal (the setting opening θ sp) and the value indicated by the valve opening signal (the actual opening θ pv), and continuously changes the value in accordance with this deviation, to thereby output an adjusted electric current signal (adjusted electric current) Io. A control transistor Q1 is used in adjusting the electric current in the control unit 1.

The electric pneumatic converter 2 inputs the electric current signal (adjusted electric current) Io from the control unit 1, to convert the inputted electric current signal (the adjusted electric current) Io into a pneumatic signal Pn. The pilot relay 3 amplifies the pneumatic signal Pn from the electropneumatic converter 2, to supply it to the operating device 7 of the regulator valve 300 as the output pneumatic pressure Pout.

The comparing circuit 6 branch inputs the control signal into the control unit 1 from the higher-level device 100, and compares the value of the control signal that has been branch-inputted with a normal range that has been set relative to this control signal, and outputs the comparison result to the control unit 1.

In the present example, the normal range for the control signal in the comparing circuit 6 is established as between 5 and 19 mA. That is, 5 mA is set as the lower limit threshold value for the comparing circuit 6 and 19 mA is set as the upper limit threshold value.

The control unit 1, when sent a comparison result from the comparing circuit 6 indicating that the value of the control signal is outside of the normal range, forcibly adjusts the electric current signal (the adjusted electric current) Io to the electropneumatic converter 2 to zero, regardless of the deviation between the value indicated by the control signal (the setting opening θ sp) and the value indicated by the valve opening signal (the actual opening θ pv). Doing so reduces the output pneumatic pressure Pout from the positioner 200 to essentially near zero, causing the regulator valve 300 to be closed forcibly.

The adjustment of the electric current signal (the adjusted electric current) Io in the control unit 1 is performed using the normal function that is possessed by the control unit 1, that is, using the function that continuously changes the value of the electric current signal (the adjusted electric current) Io in accordance with the deviation between the value indicated by the control signal (the setting opening θ sp) and the value indicated by the valve opening signal (the actual opening θ pv).

Consequently, in the positioner 201 according to the present example, there is no need to provide the electronic switch in the path by which the electric current signal (the adjusted electric current) Io is provided to the electropneumatic converter 2 from the control unit 1, as there is in the conventional positioner 200, and thus is unaffected by damage to the electronic switch, and also avoids cost increases.

In this way, in the positioner 201 according to the present example the electronic switch is not provided in the adjusted electric current loop, and the emergency shutdown function can be achieved without depending on software, thus increasing reliability and achieving a reduction in cost.

Figure 2:
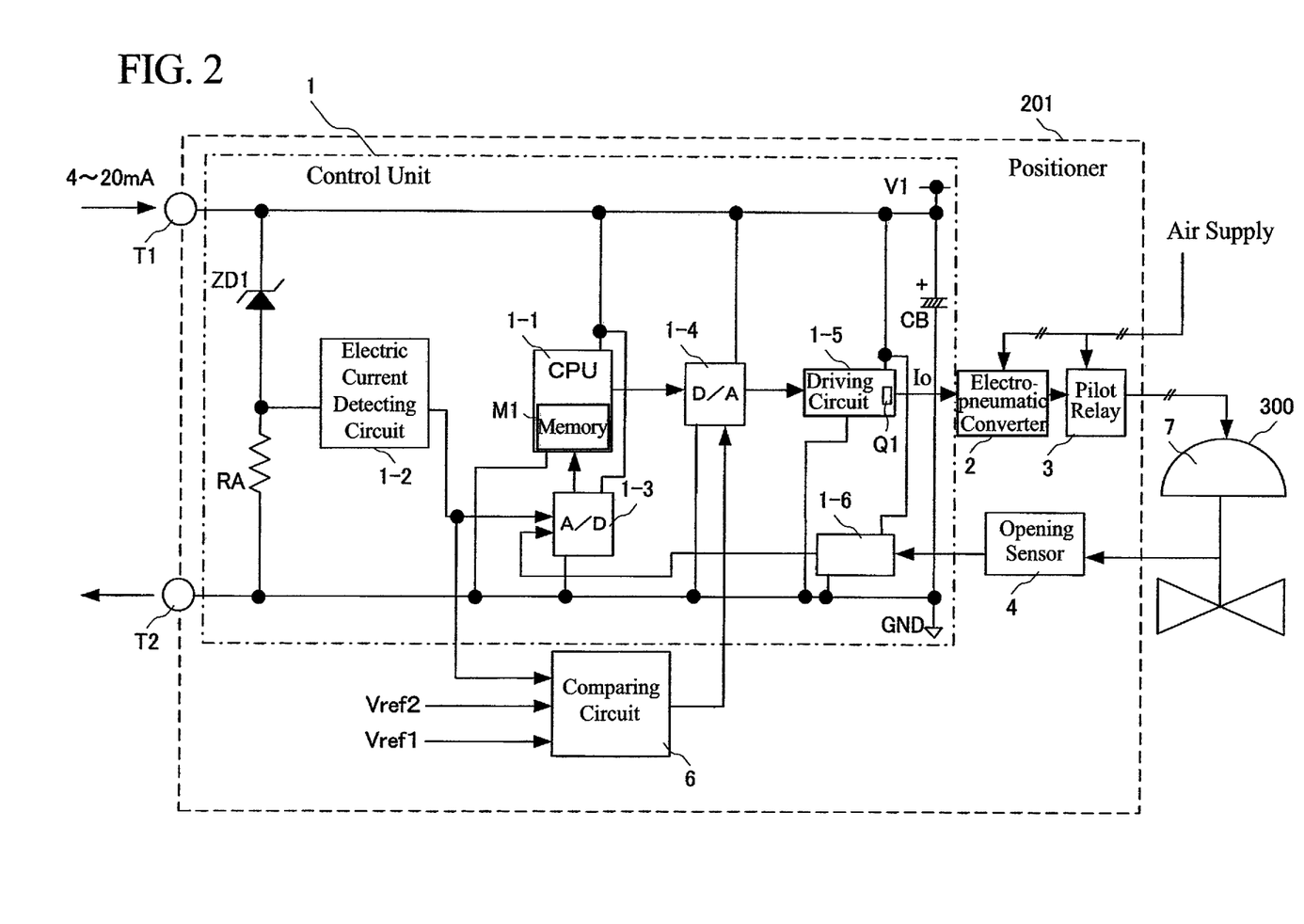
FIG. 2 is a diagram illustrating the configuration within the control unit in a conventional positioner.

FIG. 2 illustrates the structure of a control unit 1 in the positioner 201 illustrated in FIG. 1. In FIG. 2, the input terminals T1 and T2 input control signals (DC electric current signals) that are between 4 and 20 mA. A zener diode ZD1 is connected through a resistance RA to the input terminals T1 and T2, to produce a power supply voltage for use by the internal circuitry CPU 1-1, and the like. A capacitor CB is a decoupling circuit for the power supply voltage V1, to prevent transfer or feedback of energy between the power supply voltage V1 and the ground GND.

An electric current detecting circuit 1-2 detects the value of the control signal that is inputted into the input terminals T1 and T2, and sends the value of the control signal that has been detected to an A/D converting device 1-3 and to the comparing circuit 6. The CPU 1-1 performs the opening control of the regulator valve 300, and has a control program for, for example, PID control stored in a memory M1. Because the control output of the CPU 1-1 is a digital signal, it is converted into an analog signal by a D/A converting device 1-4.

The driving circuit 1-5 is provided with a control transistor Q1, and amplifies the analog signal sent from the D/A converting device 1-4 and converts the impedance thereof, to send it to the electropneumatic converter 2 as the electric current signal (the adjusted electric current) Io. A sensor interface circuit 1-6 processes the valve opening signal from the opening sensor 4, and sends the result to the A/D converting device 1-3. The A/D converting device 1-3 converts into a digital signal, and sends to the CPU 1-1, the value of the control signal that is sent from the electric current detecting circuit 1-2 and the value of the valve opening signal sent from the sensor interface circuit 1-6.

Figure 3:
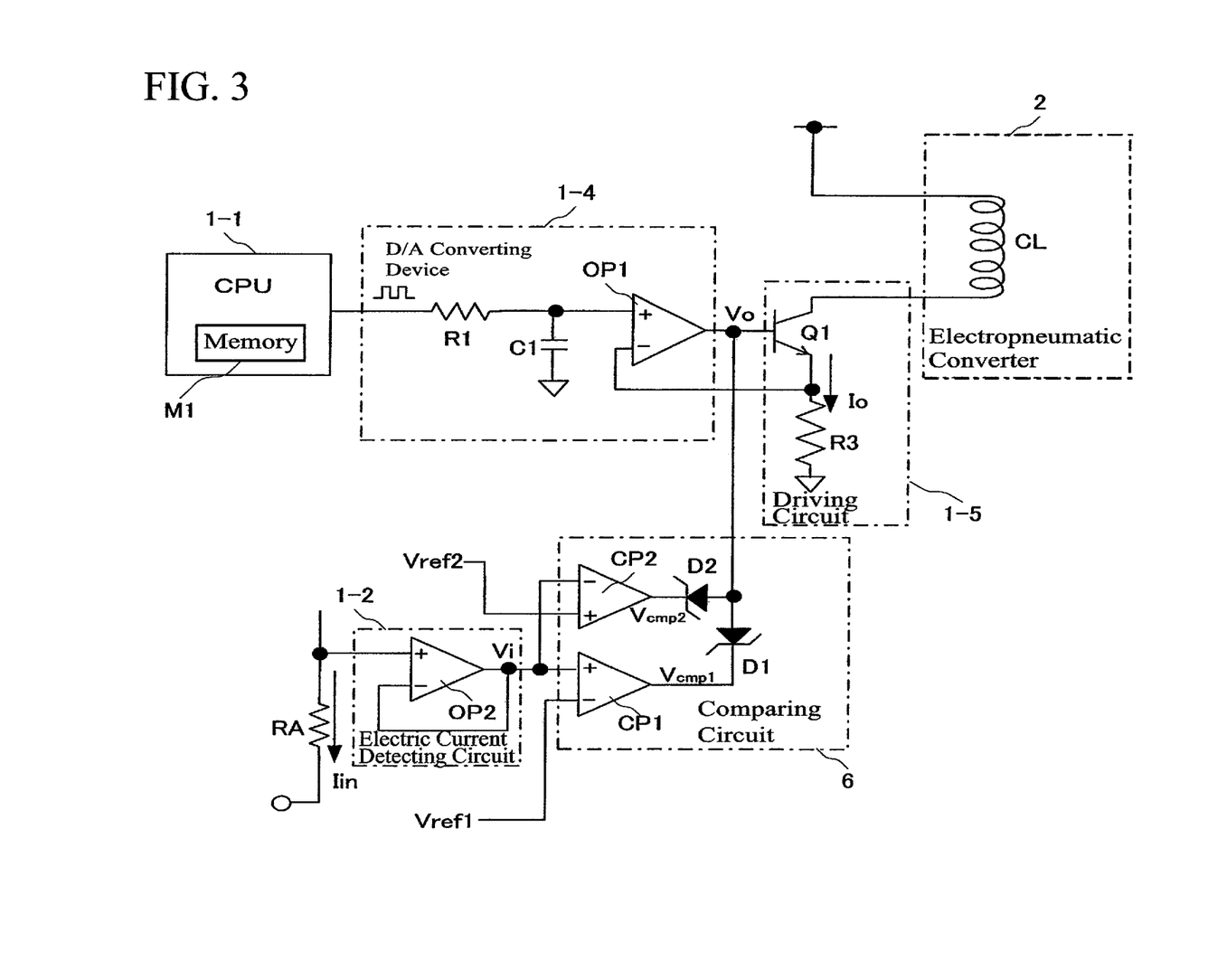
FIG. 3 is a diagram illustrating the combination of an electric current detecting circuit, a D/A converter, a driving circuit, and other circuit structures with the circuit structure of the comparing circuit in the positioner.

FIG. 3 shows the combination of the electric current detecting circuit 1-2, the D/A converting device 1-4, the driving circuit 1-5, and the like, that are the circuit structure of the comparing circuit 6, with other circuit structures. The D/A converting device 1-4 is provided with a resistance R1, a capacitor C1, and an op-amp OP1, to convert into a voltage signal (an analog signal) Vo, the control output (a digital signal) from the CPU 1-1. The driving circuit 1-5 is provided with a control transistor Q1 and a resistance R3, to generate an electric current signal (the adjusted electric current) Io in accordance with the voltage signal Vo from the D/A converting device 1-4, to provide it to the magnetic excitation coil CL of the electropneumatic converter 2.

The electric current detecting circuit 1-2 is structured as a buffer circuit made from an op-amp OP2, and generates a voltage Vi in accordance with the value of the electric current Iin that flows through a resistance RA. The comparing circuit 6 is structured from a first comparator CP1, a second comparator CP2, and schottky diodes D1 and D2. In the comparing circuit 6, a reference voltage Vref1 is set at the inverting input terminal of the comparator CP1, and a reference voltage Vref2 is set at the non-inverting input terminal of the comparator CP2, where a voltage Vi that is in accordance with the value of the electric current Iin that is detected by the electric current detecting circuit 1-2 is inputted into the non-inverting input terminal of the comparator CP1 and into the inverting input terminal of the comparator CP2. The schottky diodes D1 and D2 are connected between the output terminals of the comparators CP1 and CP2, and the output line for the voltage signal Vo from the D/A converting device 1-4 to the driving circuit 1-5, with the cathodes thereof on the comparator CP1 and CP2 side.

Figure 4:
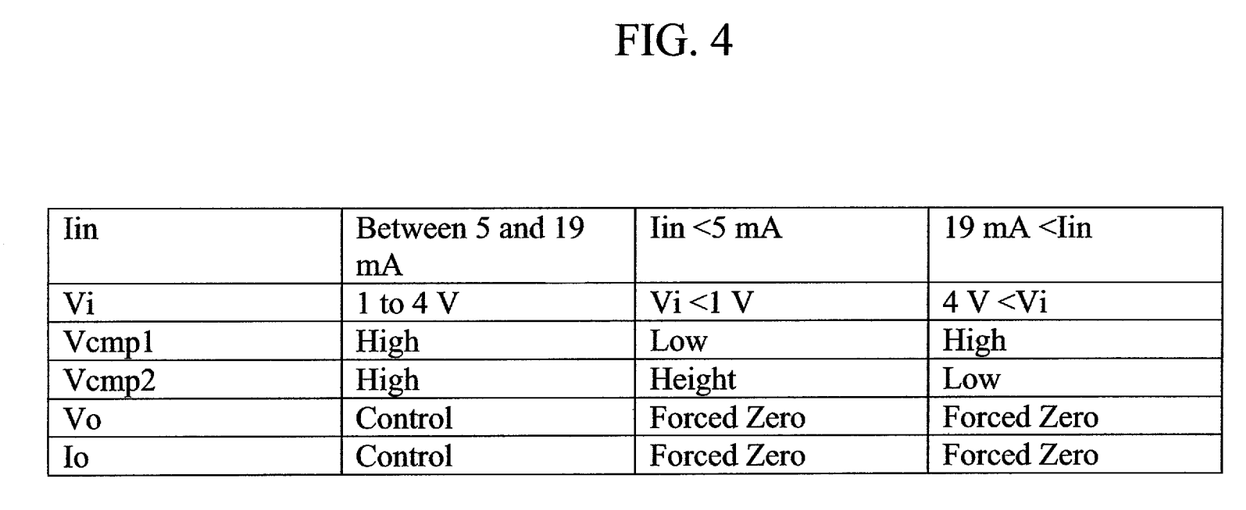
FIG. 4 is a diagram for explaining the operation of the circuit structure illustrated in FIG. 3.

The operation of the circuit configuration illustrated in FIG. 3 is explained using FIG. 4. In this circuit configuration, the electric current Iin that flows in the resistance RA indicates the value of the control signal from the higher-level device 100. In the present example, the normal range for the control signal is between 5 and 19 mA, that is, has a lower limit threshold value at 5 mA and an upper limit threshold value at 19 mA, where the reference voltage Vref1 is set to Vref1=1 V and the reference voltage Vref2 is set to Vref2=4 V for the comparing circuit 6 in correspondence therewith.

If the value of the control signal is between 5 and 19 mA, then the voltage Vi that corresponds with the value of the electric current Iin that is detected by the electric current detecting circuit 1-2 can vary between 1 V and 4 V (1 V≤Vi≤4 V). In this case, the outputs of Vcmp1 and Vcmp2 of the comparators CP1 and CP2 can both be at the "Hi" level, so the voltage signal Vo from the D/A converting device 1-4 can be applied to the driving circuit 1-5, where the driving circuit 1-5 produces the electric current signal (the adjusted electric current) Io in accordance with the voltage signal Vo from the D/A converting device 1-4.

In contrast, if the value of the control signal is less than 5 mA, that the voltage Vi that corresponds to the value of the electric current Iin that is detected by the electric current detecting circuit 1-2 can be less than 1 V, so the output Vcmp1 from the comparator CP1 can go to the "Lo" level. Because of this, the voltage signal Vo from the D/A converting device 1-4 to the driving circuit 1-5 can be forced to zero, so that the electric current signal (the adjusted electric current) Io that is produced by the driving circuit 1-5 can go to zero.

Moreover, if the value of the control signal is greater than 19 mA, that the voltage Vi that corresponds to the value of the electric current Iin that is detected by the electric current detecting circuit 1-2 can be greater than 4 V, so the output Vcmp2 from the comparator CP2 can go to the "Lo" level. Because of this, the voltage signal Vo from the D/A converting device 1-4 to the driving circuit 1-5 can be forced to zero, so that the electric current signal (the adjusted electric current) Io that is produced by the driving circuit 1-5 can go to zero.

Note that while in the present example the normal range for the control signal was set to between 5 and 19 mA, this is nothing more than a mere example, and there is no limitation to being between 5 and 19 mA. For example, that the normal range may be set to be higher than 5 mA, or the normal range may be set to be lower than 19 mA. If the normal range is set to being above 5 mA, then, in the circuit structure of the comparing circuit 6 illustrated in FIG. 3, the comparator CP2 and the schottky diode D2 may be eliminated, and if the normal range is set to being below 19 mA, then the comparator CP1 and the schottky diode D1 may be eliminated.

The positioner according to examples of the present invention can be used in a variety of fields, such as process control, for controlling the opening of a regulator valve.

I claim:
1. A positioner comprising:
   a controller:
      inputting a control signal sent from a higher-level device and inputting a valve opening signal fed back from a regulator valve,
      calculating a deviation between a value indicated by the control signal and a value indicated by the valve opening signal,
      adjusting a value of an electric current flow using a control transistor in the controller by continuously changing the value of the electric current flow through the control transistor in accordance with the deviation, and
      outputting an adjusted electric current that is an electric current signal;
   an electropneumatic converter converting into a pneumatic signal the electric current signal from the controller, supplies an output pneumatic pressure to an operating device for the regulator valve based on the pneumatic signal from the electropneumatic converter; and
   a comparing circuit receiving a branch-input of the control signal from the higher-level device to the controller and comparing a value of the branch-input control signal to a normal range established for the control signal, and outputting, to the controller, the comparison result, wherein:
      if the comparison result indicating that the value of the control signal is inside of the normal range, the controller adjusts the value of the electric current in accordance with the deviation, and
      if a comparison result indicating that the value of the control signal is outside of the normal range is sent from the comparing circuit, the controller forcibly adjusts to zero the electric current signal that is the value of the adjusted electric current flow by the control transistor to the electropneumatic converter regardless of the deviation wherein the controller forcibly adjusts to zero the electric current signal without an electronic switch and without software.

* * * * *